United States Patent [19]
Inaho et al.

[11] Patent Number: 5,102,579
[45] Date of Patent: Apr. 7, 1992

[54] METHOD FOR PREPARING SULFIDE PHOSPHORS

[75] Inventors: Shuji Inaho, Odawara, Japan; Michael D. Christiansen, Stephensburg, N.J.

[73] Assignees: USR Optonix, Inc., Beattystown, N.J.; Kasei Optonix, Ltd., Tokyo, Japan

[21] Appl. No.: 496,949

[22] Filed: Mar. 21, 1990

[51] Int. Cl.$^5$ .................. C01B 17/00; C09K 11/00
[52] U.S. Cl. .................. 252/301.4 S; 423/444; 423/566.1; 252/301.6 S
[58] Field of Search .......... 252/301.6 S, 301.4 S; 423/511, 561.1, 444

[56] References Cited

U.S. PATENT DOCUMENTS 2,573,817  4/1949  Thomsen ............ 252/301.6 S
3,957,678  5/1976  Dikhoff et al. ........ 252/301.6 S

FOREIGN PATENT DOCUMENTS 54-19483  2/1979  Japan ................ 252/301.6 S
265994   10/1927  United Kingdom .......... 423/444

Primary Examiner—Gary P. Straub
Assistant Examiner—Timothy C. Vanoy
Attorney, Agent, or Firm—Oblon, Spivak, McClelland, Maier & Neustadt

[57] ABSTRACT

A method for preparing a sulfide phosphor where a raw material mixture for a sulfide phosphor is placed in an almost closed first heat-resistant container and fired therein, the method being characterized in that an auxiliary material composed of carbon and/or a carbon-forming compound capable of being pyrolyzed at a temperature not higher than the firing temperature to form carbon, and a metal sulfide capable of recting with the carbon and/or said carbon-forming compound at a temperature not lower than 600° C. but not higher than the firing temperature to form a carbon sulfide is placed in the portion as physically separated from the raw material mixture for the sulfide phosphor in the said first heat-resistant container and the firing is conducted under such condition so that said first heat-resistant container may have a carbon sulfide atmosphere by the thermal reaction of the thus fired auxiliary materials.

20 Claims, 2 Drawing Sheets

METHOD FOR PREPARING SULFIDE PHOSPHORS

BACKGROUND OF THE INVENTION

1. Field of the Invention

The present invention relates to a method for preparing sulfide phosphors and, in particular, to a method for preparing sulfide phosphors of high luminance by industrial mass-production by efficiently controlling the firing atmosphere in preparing the sulfide phosphors.

2. Discussion of Background

Phosphors composed of a host material of a sulfide of a formula $(Zn_{1-x}Cd_x)S$ where $0 \leq X \leq 1$, such as zinc sulfide (ZnS) or zinc cadmium sulfide ((Zn,Cd)S), as activated by an activator of silver (Ag), copper (Cu) or gold (Au) are practically used in color picture tubes or fluorescent display tubes and have an extremely long history. Phosphors composed of a host material of an alkaline earth metal sulfide, such as calcium sulfide (CaS) or strontium sulfide (SrS), as activated by an activator of a rare earth element, such as cerium (Ce), europium (Eu), samarium (Sm), terbium (Tb), dysprosium (Dy) or thulium (Tm) are also known as regenerative phosphors from the past and, additionally, they are being investigated for use in electroluminescent (EL) devices in these days. Since the sulfide phosphors ("sulfide phosphors" as referred to herein indicate any and every phosphor having a sulfide as a host material thereof, including the above-mentioned phosphors) have a sulfide as its host material, firing thereof is to be effected in a sulfurizing atmosphere or in a neutral atmosphere for the purpose of preventing them from being oxidized. In general, such firing is effected in a sulfurizing atmosphere. In the past, the raw material for the phosphor was fired in a hydrogen sulfide stream. However, hydrogen sulfide is toxic and the handling thereof is difficult. Therefore, a different method has been employed where the raw material for a phosphor is blended with carbon and sulfur, or carbon and sulfur are directly brought into contact with the raw material mixture for a phosphor and the resulting raw material mixture is placed in a covered heat-resistant container and heated therein whereby the mixture is fired in a sulfurizing atmosphere containing carbon sulfide to be formed by the thermal reaction between the carbon and sulfur in the said heat-resistant container (U.S. Pat. Nos. 3,595,804 and 2,623,858). Apart from this, another method of using an organic substance such as saccharides which contain a large amount of carbon atoms as the constituting component and which may easily be converted into carbon oxide gases by firing has been proposed but has not yet been put to industrial or practical use.

Where sulfide phosphors are prepared in a sulfurizing atmosphere, if the sulfurizing atmosphere is lost even temporarily in the firing step, the phosphor would be oxidized. As a result, a sulfide phosphor of high luminance could not be obtained by the process. Therefore, it is especially essential to continuously maintain the sulfurizing atmosphere around the raw material mixture being fired during the period of from the middle stage of firing to the latter stage thereof while the raw material mixture for the phosphor is allowed to stand at a determined temperature for a determined period of time so as to promote the interaction of the components of the raw material mixture to finally produce the intended phosphor.

However, in accordance with the known method where the raw material mixture for phosphor is fired in the presence of carbon and sulfur to give the necessary sulfurizing atmosphere and a sulfide phosphor of high luminance is prepared from the mixture, it was found that a large amount of the sulfur evaporates and almost all the incorporated sulfur disappears in the initial firing stage since the boiling point of sulfur is far lower than the firing temperature of the sulfide phosphor and, as a result, the sulfur necessary for maintaining the sulfurizing atmosphere is lacking and a sufficient sulfurizing atmosphere could not be maintained during the period of from the middle stage of firing to the latter stage thereof while the intended phosphor is being produced. Specifically, it was found that, in the known method of preparing a sulfide phosphor where the raw material mixture for the phosphor is placed in the firing container along with carbon and sulfur and is fired therein, there is a noticeable time lag between the stage where the sulfurizing atmosphere is most required for the production of the phosphor and the stage where the incorporated carbon and sulfur are reacted to give a sufficient sulfurizing gas atmosphere. Accordingly, it is necessary that a large amount of carbon and a large amount of sulfur are to be placed in the firing container along with the raw material mixture for phosphor for the purpose of maintaining the sufficient sulfurizing atmosphere during the step of producing the phosphor from the raw material mixture thereof. In such case, however, the proportion of the raw material mixture for phosphor in the firing container would be relatively smaller than the enlarged amounts of the carbon and sulfur therein and, as a result, there is a problem of lowering the producibility of the phosphor product. Accordingly, such problem is desired to be overcome.

SUMMARY OF THE INVENTION

The present invention has been produced in view of the above mentioned situations. Accordingly, it is the object of the present invention to provide a method for preparing a sulfide phosphor of high luminance by industrial mass-production, in which introduction of a toxic gas such as hydrogen sulfide into the firing container from the outward is unnecessary and the atmosphere in the firing container is a sulfurizing atmosphere suitable for production of the sulfide phosphor during the step of firing the raw material mixture for the phosphor.

The inventors of the present invention conducted various investigations to accomplish the above object. Specifically, they studied such materials that could form a sulfurizing gas in the firing container when fired along with the raw material mixture for phosphor for the purpose of maintaining the sulfurizing atmosphere in the inside of the firing container throughout the firing stage (the material of the kind is hereinafter referred to as an "auxiliary material"). As a result, they found that employment of a combination of carbon and a sulfide of a particular metal having a relatively higher melting point than sulfur or a mixture of such a sulfide, carbon and sulfur as an auxiliary material, in place of the combination of carbon and sulfur which has heretofore been employed as the auxiliary material in the prior art, is effective for maintaining a pertinent sulfurizing atmosphere in the inside of the firing container even in the latter stage after the middle stage of firing and therefore a phosphor of high luminance can be obtained under the firing conditions. On the basis of such finding, they have hereby achieved the present invention. In accordance with the present invention, there is provided a method for preparing a sulfide phosphor where a raw material mixture for a sulfide phosphor is placed in an almost closed heat-resistant container and fired therein, the method being characterized in that an auxiliary material (I) composed of carbon and/or a compound capable of being pyrolyzed at a temperature not higher than the firing temperature to form carbon, and a metal sulfide capable of reacting with the carbon and/or the carbon-forming compound at a temperature not lower than 600° C. but not higher than the firing temperature to form a carbon sulfide, or an auxiliary material (II) composed of carbon and/or a compound capable of being pyrolyzed at a temperature not higher than the firing temperature to form carbon, a metal sulfide capable of reacting with the carbon and/or the carbon-forming compound at a temperature not lower than 600° C. but not higher than the firing temperature to form a carbon sulfide, and sulfur is placed in the heat-resistant container such that the auxiliary material is physically separated from the raw material mixture, so that the auxiliary materials are fired to give a carbon sulfide atmosphere in the heat-resistant container by the thermal reaction thereof.

DETAILED DESCRIPTION OF THE PREFERRED EMBODIMENT

Figure 1A:
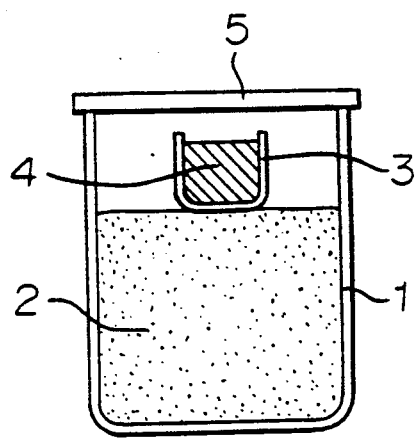
FIG. 1 shows sectional views to outline some embodiments of arrangement of the raw material mixture for phosphor and the auxiliary material in a firing heat-resistant container, which are processed in accordance with the method of the present invention or with the conventional method.

The method for preparing the sulfide phosphors of the present invention will be mentioned hereunder.

In preparing the sulfide phosphors in accordance with the method of the present invention, a raw material for the matrix such as ZnS or (Zn,Cd)S, a raw material for the activator such as a compound of Ag, a compound of Cu or a compound of Au and a raw material for the co-activator such as a compound of Al or a compound of Ga are weighed each in a determined amount and, if desired, a flux such as NaCl, KCl or $ZnCl_2$ is added thereto and fully blended to obtain a raw material mixture for the phosphor of the invention. Next, the raw material mixture is filled in the first heat-resistant container, and an auxiliary material composed of carbon and/or a carbon-forming compound capable of being pyrolyzed at a high temperature to give carbon (hereinafter referred to as "carbon") and a metal sulfide capable of reacting with the said "carbon" at a temperature not lower than 600° C. but not higher than the firing temperature to give carbon sulfide (hereinafter referred to as "metal sulfide") or an auxiliary material composed of the said "carbon", the said "metal sulfide" and sulfur is placed in the container physically separated from the above-mentioned raw material mixture for the phosphor. Afterwards, the heat-resistant container is covered with a lid and is put in a high-temperature firing furnace where the raw material mixture and the auxiliary material are fired in a manner which allows introduction of a neutral gas such as nitrogen gas or argon gas thereinto. The firing temperature may vary in accordance with the composition of the sulfide phosphor to be produced (precisely, the composition of the host material of the phosphor matrix, and the kinds of the activator and co-activator) but may fall within a range of 800° C. to 1250° C. like the case of preparing conventional sulfide phosphors. Above all, the firing is especially preferably effected at a temperature falling within a range of 900° C. to 1100° C.

The sulfide phosphor to be prepared by the method of the present invention includes sulfide phosphors composed of a sulfide host material of zinc (Zn) and/or cadmium (Cd) of a general formula $(Zn_{1-x},Cd_x)S$ where ($0 \leq X \leq 1$), such as ZnS or (Zn,Cd)S, the said host material being self-activated, sulfide phosphors composed of the said sulfide matrix as activated with silver (Ag), copper (Cu), gold (Au) or lead (Pb) and co-activated with aluminium (Al), gallium (Ga), indium (In) or thallium (Tl), and sulfide phosphors composed of a matrix of an alkaline earth metal sulfide such as CaS or SrS as activated with a rare earth element such as europium (Eu), cerium (Ce), samarium (Sm) or thulium (Tm). Above all, the method of the present invention is especially effective for preparing sulfide phosphors containing aluminium (Al) as a co-activator, such as ZnS:Cu,Al phosphor, ZnS:Ag,Al phosphor, ZnS:Au,-Cu,Al phosphor or (Zn,Cd)S:Cu,Al phosphor, since aluminium (Al) is easily diffused in the phosphor crystals. Accordingly, Al-containing sulfide phosphors having a higher luminance can be prepared by the method of the present invention, than those prepared by the conventional methods.

In addition, sulfide phosphors having a halogen such as chlorine (Cl), bromine (Br) or iodine (I) as the co-activator may also be prepared by the method of the present invention. In the case, however, some improvement of the emission luminance of the phosphors prepared by the method of the present invention could be observed as compared with the phosphors prepared by the conventional methods.

The "carbon" to be employed as one auxiliary material in the method for preparing the sulfide phosphors of the present invention includes, for example, particle carbons such as coconut carbon granules and additionally organic compounds which are pyrolyzed during the step of firing the raw material mixture of the phosphor to give a free carbon, such as sugar or wax.

The "metal sulfide" to be employed as another auxiliary material in the method for preparing the sulfide phosphors of the present invention includes, for example, sulfides of metals such as iron (Fe), copper (Cu), zinc (Zn), lead (Pb), cadmium (Cd), silver (Ag), cobalt (Co), tin (Sn), manganese (Mn), calcium (Ca), strontium (Sr), bismuth (Bi) or antimony (Sb), which react with the co-existing "carbon" at a temperature not lower than 600° C. but not higher than the temperature at which the raw material mixture of the desired sulfide phosphor is fired to give a carbon sulfide such as carbon disulfide, dicarbon trisulfide, carbon monosulfide or tricarbon disulfide, and at least one of such metal sulfides is employed as the auxiliary material in the method of the present invention. Above all, at least one selected from the sulfides of metals of iron (Fe), copper (Cu), zinc (Zn), bismuth (Bi) and antimony (Sb) is especially preferably employed, as giving sulfide phosphors of high emission luminance. In particular, sulfides of iron or zinc are most recommended from the practical viewpoints that they do not contaminate the phosphors prepared and they are low-prices. The "metal sulfides" may be either definite proportional compounds where the respective metal elements and sulfur are stoichiometrically bonded to form one molecule or indefinite proportional compounds where the respective metal components and sulfur are bonded in any desired proportions.

In the method for preparing the sulfide phosphors of the present invention, the auxiliary material preferably contains sulfur, in addition to the above-mentioned "carbon" and "metal sulfide". Where such sulfur-containing auxiliary material is employed, a part of the sulfur which has gasified at a relatively low temperature in the initial stage of firing could react with the co-existing "metal sulfide" to be trapped as an indefinite proportional compound of "metal sulfide", and the thus trapped compound could also react with the co-existing "carbon" after the middle stage of firing. Accordingly, employment of such sulfur-containing auxiliary material is more effective for continuously maintaining the sulfurizing atmosphere in the inside of the heat-resistant container throughout the step of firing the phosphors.

Figure 1B:
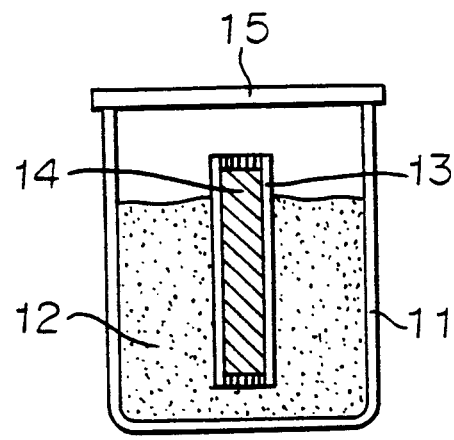
Figure 1C:
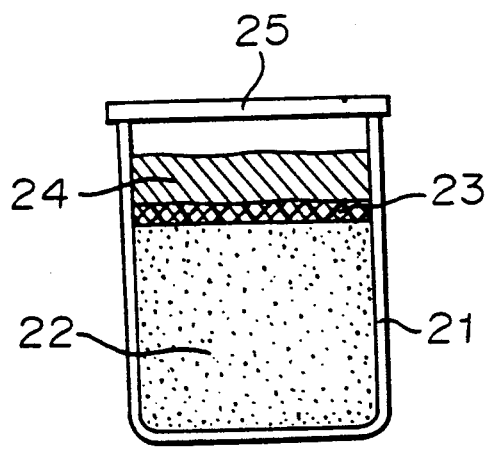

The embodiments of FIG. 1 are referred to for firing the raw material mixture for phosphors in accordance with the method of the present invention. Precisely, the raw material mixture for the phosphor and the auxiliary material are put in the heat-resistant container in such a way that they are physically separated from each other, as shown in FIG. 1, and the heat-resistant container is covered with a lid, put in a heating furnace and fired therein. Accordingly, FIG. 1 illustrates the embodiments of the arrangement of the raw material mixture for the phosphor and the auxiliary material in the heat-resistant container, in preparing the sulfide phosphor by the method of the present invention. Specifically, in the embodiment of FIG. 1(A), the raw material mixture (2) for the phosphor of a determined amount is filled in the first heat-resistant container (1), and the second heat-resistant container (3) filled with the auxiliary material (4) is put on the raw material mixture (2), and thereafter the container (1) is covered with the lid (5) and fired. In the case, at least the wall of the second heat-resistant container (3) which is to be in contact with the raw material mixture (2) may have numerous gas permeable small through-holes. FIG. 1(B) illustrates another embodiments, where the raw material mixture (12) for the phosphor is filled in the heat-resistant container (11) while the second heat-resistant container (13) filled with the auxiliary material (14) having ends sealed with heat-resistant inorganic fibers, such as quarts cloth, is embedded into the raw material mixture (12) placed in the first heat-resistant container (11) raw material mixture (12), and the container (11) is then covered with the lid (15) and fired. Also in the case, at least the wall of the second heat-resistant container (13) which is to be in contact with the raw material mixture (12) for the phosphor may have numerous gas-permeable small through holes. FIG. 1(C) illustrates still another embodiments where the raw material mixture (22) for the phosphor is filled in the first heat-resistant container (21), the air-permeable partition wall (23) made of heat-resistant inorganic fibers such as quartz cloth is provided thereover, and the auxiliary material (24) is superposed over the wall (25), and finally the container (21) is covered with the lid (25) and fired.

Figure 2A:
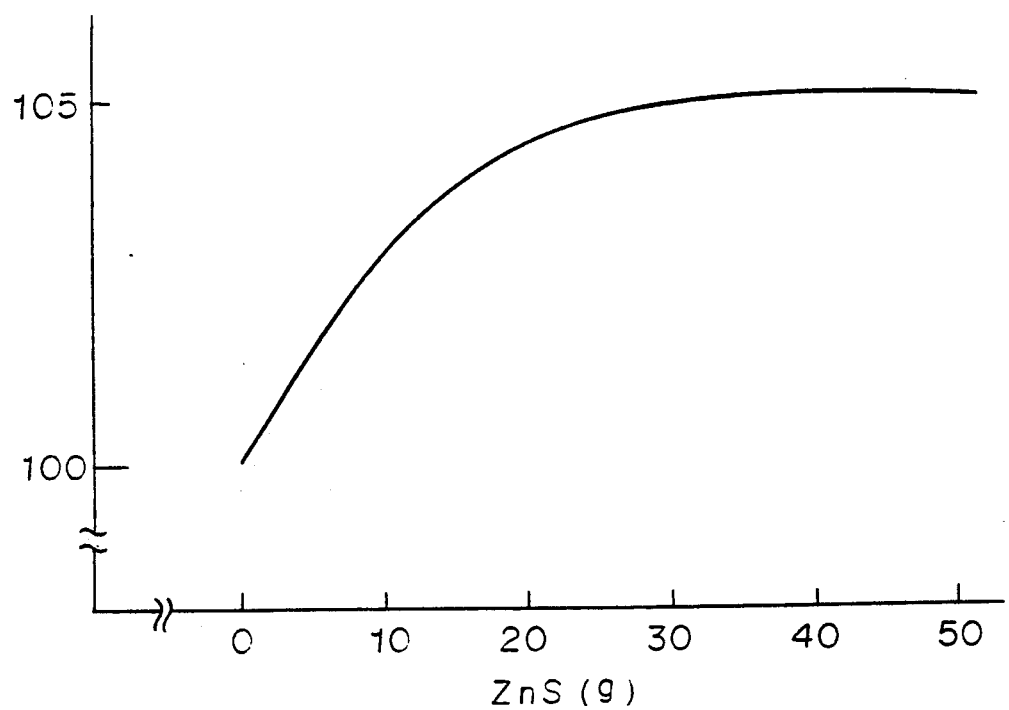
FIG. 2 shows graphs to illustrate the relations between the amount of the auxiliary material to be employed in the method for preparing the sulfide phosphor of the present invention and the relative brightness of the sulfide phosphor to be obtained and the chromaticity coordinates as expressed by CIE standard chromaticity diagram.
Figure 2B:
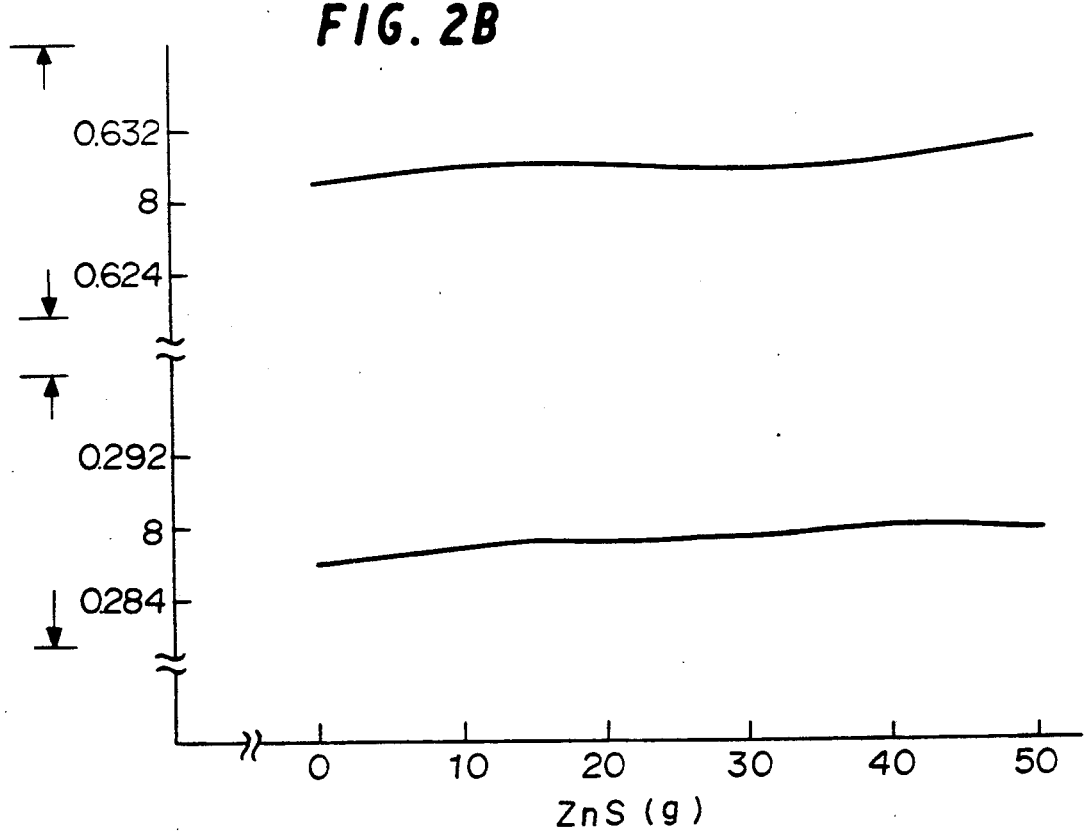

FIG. 2(A) is a graph to show the relation between the amount of the "metal sulfide" (ZnS) in the case of using a combination of zinc sulfide (ZnS) as one auxiliary material of "metal sulfide" and carbon as the other auxiliary material in preparing ZnS:Cu,Al phosphor and the emission luminance of the ZnS:Cu,Al phosphor to be obtained in the case. FIG. 2(B) is a graph to show the chromaticity points (x value and y value) when the emitted color from the phosphors obtained as above is expressed by the chromaticity coordinates of CIE standard chromaticity diagram. In the embodiment, the weight of the raw material mixture for the phosphor was 700 g, and this was put in the firing container in the way of FIG. 1(A) along with a determined amount of the auxiliary material mixture comprising ZnS ("metal sulfide") and carbon and fired therein. In the case, the abscissa of both FIG. 2(A) and FIG. 2(B) indicates the amount of ZnS as filled in the second heat-resistant container as one auxiliary material. The point "0" of ZnS means the conventional method, where an auxiliary material of a mixture comprising sulfur and carbon was filled in the second heat-resistant container, in place of the auxiliary material system composed of ZnS ("metal sulfide") and carbon, in the manner of FIG. 1(A) and fired along with the raw material mixture for the phosphor to obtain ZnS:Cu,Al phosphor. That is to say, the point "0" of ZnS indicates the emission luminance and the emitted color from the ZnS:Cu,Al phosphor thus prepared by the conventional method. As is clear from FIG. 2(A) and FIG. 2(B), the increase of the amount of ZnS which was employed as one auxiliary material in the present embodiment resulted in the elevation of the emission luminance of the product of ZnS;Cu,Al as prepared. After all, when the amount of ZnS used was made larger than 30 g, the emission luminance of the product became relatively constant, whereupon the emitted color from the phosphor obtained did not vary much, irrespective of the excess amount of the auxiliary material ZnS used. In the other cases than the above, where other sulfide phosphors than ZnS:Cu,Al are prepared or where other "metal sulfides" than ZnS are employed as one auxiliary material component, the relationships between the amount of the "metal sulfide" to be employed as the auxiliary material along with the raw material mixture for the phosphor and the emission luminance of the sulfide phosphor to be obtained as well as the emitted color therefrom are similar to those illustrated in FIG. 2(A) and FIG. 2(B). Accordingly, it was verified that, when the "metal sulfide" of not less than a determined amount is employed as one auxiliary material along with the raw material mixture for the phosphor, in preparing the sulfide phosphor by the method of the present invention, the emission luminance of the product could be improved over that of the product to be prepared by the conventional methods without changing the color to be emitted from the sulfide phosphor of the product.

In the method for preparing the sulfide phosphors of the present invention, the minimum limit of the amount of the "metal sulfide" to be employed as the auxiliary material necessary for improving the emission luminance of the sulfide phosphor to be obtained may well be approximately from 1 to 1.5 g as the amount of sulfur(s) in the said "metal sulfide" per 100 g of the raw material mixture for the sulfide phosphor, whereupon the amount of the "carbon" of the other auxiliary material to be employed together is preferably such that may contain 50 atomic % or more carbon atoms to the amount of the sulfur(s) in the said auxiliary material "metal sulfide".

As explained in detail in the above, since the inside of the firing container may have a pertinent sulfurizing atmosphere throughout the firing procedure in accordance with the method for preparing the sulfide phosphors of the present invention, without using a large amount of the auxiliary materials, as opposed to the conventional methods, sulfide phosphors of higher luminance can be prepared more efficiently by the method of the present invention than those to be prepared by the conventional methods without changing the color to be emitted from the sulfide phosphors.

The present invention will be explained in more detail by way of the following examples, which, however, do not whatsoever restrict the scope of the present invention.

EXAMPLE 1

| Zinc Sulfide (ZnS) | 700 g |
| Silver Nitrate (AgNO$_3$) | 0.16 g |
| Aluminium Nitrate (Al(NO$_3$)$_3$.9H$_2$O) | 0.73 g |

The above-mentioned raw materials for a phosphor were weighed, and a small amount of water was added thereto to make a paste. This was kneaded, dried and sieved, and 7 g of sodium chloride (NaCl), 7 g of zinc chloride (ZnCl$_2$) and 3.5 g of sulfur (S) were added thereto and well blended in a ball mill to obtain a raw material mixture for a phosphor. The resulting mixture was then filled in a quartz crucible having a capacity of approximately one liter (the first heat-resistant container).

On the other hand, 17 g of active charcoal, 70 g of sulfur and 70 g of zinc sulfide (ZnS) were well blended to obtain an auxiliary material mixture, which was then filled in a porcelain container having a capacity of approximately 150 ml (the second heat-resistant container).

Next, as shown in FIG. 1(A), the porcelain crucible (the second heat-resistant container) as filled with the above-mentioned auxiliary material mixture was put on the above-mentioned raw material mixture for a phosphor as filled in the quartz crucible (the first heat-resistant container), and the quartz crucible (the first heat-resistant container) was covered with a lid and was then put in a high-temperature electric furnace kept at 980° C., where the materials in the containers were fired for 2 hours. The thus fired product was then taken out of the furnace and cooled and then washed with water and dried to finally obtain ZnS:Ag,Al phosphor as co-activated by 0.015% of Ag and 0.0075% of Al (Sulfide Phosphor (I)).

Apart from this, a comparative sample was prepared. Specifically, the same process as above was repeated, except that a mixture comprising 70 g of sulfur and 18 g of active charcoal was employed as the auxiliary materials to be filled in the porcelain container in place of the mixture comprising 17 g of active charcoal, 70 g of sulfur and 70 g of ZnS, and ZnS:Ag,Al phosphor as co-activated with 0.015% of Ag and 0.0075% of Al (Sulfide Phosphor (I-R)) was prepared.

The thus prepared Sulfide Phosphor (I) and Sulfide Phosphor (I-R) were compared with each other with respect to the emission luminance and the emission color under the excited condition with electron beams. The results obtained are shown in Table 1 below. As is obvious therefrom, Sulfide Phosphor (I) prepared by the method of the present invention showed a higher emission luminance than Sulfide Phosphor (I-R) prepared by the conventional method without changing the emission color therefrom.

TABLE 1

| | Relative Emission Luminance (%) | Emission Color (chromaticity coordinates of CIE standard chromaticity diagram) |
| --- | --- | --- |
| ZnS:Ag,Al Phosphor (Sulfide Phosphor (I)) | 106 | (x = 0.146) (y = 0.053) |
| ZnS:Ag,Al Phosphor (Sulfide Phosphor (I-R)) | 100 | (x = 0.146) (y = 0.052) |

EXAMPLE 2

| Zinc Sulfide (ZnS) | 700 g |
| Copper Nitrate (Cu(NO$_3$)$_2$.6H$_2$O) | 0.49 g |
| Aluminium Nitrate (Al(NO$_3$)$_3$.9H$_2$O) | 0.58 g |

The above-mentioned raw materials for a phosphor were weighed, and a small amount of water was added thereto to make a paste. This was kneaded, dried and sieved, and 7 g of sodium chloride (NaCl) and 7 g of zinc chloride (ZnCl$_2$) and 3.5 g of sulfur (S) were added thereto and well blended in a ball mill to obtain a raw material mixture for a phosphor. The resulting mixture was then filled in a quartz crucible having a capacity of approximately one liter (the first heat-resistant container).

On the other hand, 17 g of active charcoal, 70 g of sulfur and 70 g of zinc sulfide (ZnS) were well blended to obtain an auxiliary material mixture, which was then filled in a quartz tube having both open ends and having an inner diameter of approximately 50 mm (the second heat-resistant container). The both open ends of the said quartz tube were sealed with glass wool. Next, as shown in FIG. 1(B), at least a part of the quartz tube was embedded into the above-mentioned raw material mixture for a phosphor as filled in the first heat-resistant container, and then the first heat-resistant container was covered with a lid and put into a high-temperature electric furnace kept at 980° C., where the materials in the containers were fired for 2 hours. The thus fired product was then taken out of the furnace and cooled and then washed with water and dried to finally obtain ZnS:Cu,Al phosphor as co-activated with 0.015% of Cu and 0.006% of Al (Sulfide Phosphor (II)).

Apart from this, a comparative sample was prepared in the same manner. Specifically, the same process as above was repeated, except that an auxiliary material mixture comprising 70 g of sulfur and 18 g of active charcoal was put in a porcelain container having a capacity of approximately 150 ml and the container was put on the raw material mixture for the phosphor as filled in the quartz crucible (the first heat-resistant container) as shown in FIG. 1(A), in place of employing the auxiliary material mixture comprising 17 g of active charcoal, 70 g of sulfur and 70 g of ZnS as filled in the quartz tube (the second heat-resistant container), and ZnS:Cu,Al phosphor as co-activated with 0.015% of Cu and 0.006% of Al (Sulfide Phosphor (II-R)) was prepared.

The thus prepared Sulfide Phosphor (II) and Sulfide Phosphor (II-R) were compared with each other with respect to the emission luminance and the emission color under the excited condition with electron beams. The results obtained are shown in Table 2 below. As is obvious therefrom, Sulfide Phosphor (II) prepared by the method of the present invention showed a higher emission luminance than Sulfide Phosphor (II-R) prepared by the conventional method without changing the emission color therefrom.

TABLE 2

| | Relative Emission Luminance (%) | Emission Color (chromaticity coordinates of CIE standard chromaticity diagram) |
|---|---|---|
| ZnS:Cu,Al Phosphor (Sulfide Phosphor (II)) | 105 | (x = 0.288) (y = 0.618) |
| ZnS:Cu,Al Phosphor (Sulfide Phosphor (II-R)) | 100 | (x = 0.284) (y = 0.620) |

EXAMPLE 3

The same process as in Example 1 was repeated, except that 70 g of iron sulfide (FeS) was employed in place of 70 g of zinc sulfide (ZnS) as one auxiliary material, and ZnS:Ag,Al phosphor as co-activated with 0.015% of Ag and 0.0075% of Al (Sulfide Phosphor (III)) was obtained.

Apart from this, a comparative sample was prepared also in the same manner. Specifically, the same process as in Example 1 of preparing Sulfide Phosphor (I-R) was repeated to obtain ZnS:Ag,Al phosphor as co-activated with 0.015% of Ag and 0.0075% of Al (Sulfide Phosphor (III-R)).

The thus prepared Sulfide Phosphor (III) and Sulfide Phosphor (III-R) were compared with each other with respect to the emission luminance and the emission color under the excited condition with electron beams. The results obtained are shown in Table 3 below. As is obvious therefrom, Sulfide Phosphor (III) prepared by the method of the present invention showed a higher emission luminance than Sulfide Phosphor (III-R) prepared by the conventional method without changing the emission color therefrom

TABLE 3

| | Relative Emission Luminance (%) | Emission Color (chromaticity coordinates of CIE standard chromaticity diagram) |
|---|---|---|
| ZnS:Ag,Al Phosphor (Sulfide Phosphor (III)) | 105 | (x = 0.149) (y = 0.054) |
| ZnS:Ag,Al Phosphor (Sulfide Phosphor (III-R)) | 100 | (x = 0.149) (y = 0.053) |

What is claimed is:

1. A method for preparing a sulfide phosphor, comprising firing in a covered heat-resistant container
   (A) a raw material comprising a host material selected from the group consisting of $(Zn_{1-x},Cd_x)S$, CaS and SrS, wherein $0 \leq X \leq 1$, and
   (B) an auxiliary material comprising (1) carbon or a carbon-forming compound or a mixture thereof, capable of being pyrolyzed at a temperature not higher than 1250° C., and
   (2) a metal sulfide, wherein the auxiliary material is physically separated from the raw material, said carbon or carbon forming compound is at least one member selected from the group consisting of active charcoal, coconut carbon granules, sugars and waxes, and the components of the auxiliary material react at a temperature of from 600° C. to 1250° C. to form a carbon sulfide atmosphere.

2. The method for preparing a sulfide phosphor as claimed in claim 1, in which said metal sulfide is a sulfide containing at least one metal selected from the group consisting of iron (Fe), copper (Cu), zinc (Zn), bismuth (Bi), antimony (Sb), lead (Pb), cadmium (Cd), silver (Ag), cobalt (Co), tin (Sn), manganese (Mn), calcium (Ca) and strontium (Sr).

3. The method for preparing a sulfide phosphor as claimed in claim 1, in which said metal sulfide is a sulfide containing at least one metal selected from the group consisting of iron (Fe), copper (Cu), zinc (Zn), bismuth (Bi) and antimony (Sb).

4. The method for preparing a sulfide phosphor as claimed in claim 1, in which the auxiliary material is put in a second heat-resistant container so as to be physically separated from the said raw material mixture for the sulfide phosphor.

5. The method for preparing a sulfide phosphor as claimed in claim 4, in which at least the wall of said second heat-resistant container which is to be in contact with said raw material mixture for the sulfide phosphor is gas-permeable.

6. The method for preparing a sulfide phosphor as claimed in claim 1, in which said auxiliary material is physically separated from said raw material mixture for the sulfide phosphor by heat-resistant inorganic fibers as put between said auxiliary material and said raw material mixture for the sulfide phosphor.

7. The method for preparing a sulfide phosphor as claimed in claim 1, in which the maximum temperature limit for the firing is within a range of 900° C. to 1100° C.

8. The method of claim 15, wherein said raw material is $(Zn_{1-x},Cd_x)S$, wherein $0 \leq X \leq 1$, and said raw material further comprises at least one compound selected from the group consisting of compounds of Ag, Cu, Au, Pb, Al, Ga, In, Tl, Cl, Br, and I.

9. The method for preparing a sulfide phosphor as claimed in claim 8, in which said sulfide phosphor is a phosphor containing aluminium (Al) as a co-activator.

10. The method for preparing a sulfide phosphor as claimed in claim 9, in which said sulfide phosphor is a self-activated phosphor or a phosphor containing at least one of silver (Ag), copper (Cu) and gold (Au) as an activator.

11. The method of claim 1, wherein said raw material is CaS or SrS, and said raw material further comprises a compound selected from the group consisting of compounds of Eu, Ce, Sm, Tm, Cl, Br, and I.

12. The method of claim 1, wherein said raw material further comprises a flux selected from the group consisting of NaCl, KCl, $ZnCl_2$ and mixtures thereof.

13. The method of claim 1, wherein said metal sulfide comprises a metal component and sulfur bonded in a desired fashion.

14. The method of claim 1, wherein said carbon or carbon forming compound is at least one member selected from the group consisting of active charcoal, coconut carbon granules, sugars and waxes.

15. The method for preparing a sulfide phosphor as claimed in claim 14, in which said sulfide phosphor contains aluminium (Al) as a co-activator.

16. The method for preparing a sulfide phosphor as claimed in claim 1, in which said sulfide phosphor is a self-activated phosphor or a phosphor containing at least one of silver (Ag), copper (Cu) and gold (Au) as an activator.

17. A method for preparing a sulfide phosphor, comprising firing in a closed container
   (A) a raw material comprising a host material selected from the group consisting of $(Zn_{1-x},Cd_x)S$, CaS and SrS, wherein $0 \leq x \leq 1$, and
   (B) an auxiliary material comprising
      (1) carbon or a carbon-forming compound or a mixture thereof, capable of being pyrolyzed at a temperature not higher than the firing temperature,
      (2) a metal sulfide, and
      (3) sulfur, wherein the auxiliary material is physically separated from the raw material, said carbon or carbon forming compound is at least one member selected from the group consisting of active charcoal, coconut carbon granules, sugars and waxes, said carbon or carbon forming compound is present in an amount such that the number of carbon atoms in said carbon or carbon forming compound is at least 50 atomic % of the number of sulfur atoms in said metal sulfide, and the components of the auxiliary material react at a temperature of from 600° C. to 1250° C. to form a carbon sulfide atmosphere.

18. The method of claim 1, wherein said metal sulfide comprises a metal component and sulfur bonded in a desired fashion.

19. The method of claim 17, wherein said carbon or carbon forming compound is at least one member selected from the group consisting of active charcoal, coconut carbon granules, sugars and waxes.

20. The method of claim 17, wherein the amount of said metal sulfide present is such that the percentage of sulfur atoms in said metal sulfide is at least 20% of the total number of sulfur atoms in said auxiliary material.

* * * * *